Patented Apr. 21, 1953

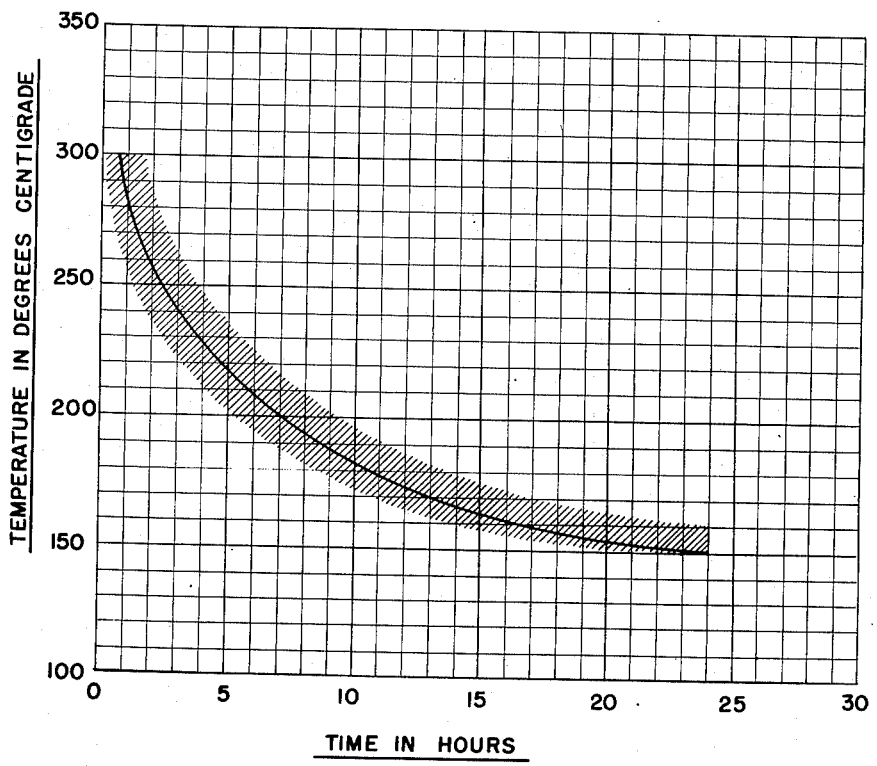

2,635,929

UNITED STATES PATENT OFFICE 2,635,929

COATED BEARING STRUCTURE

Jere E. Brophy and John Larson, United States Navy, Washington, D. C.

Application January 23, 1946, Serial No. 642,956

7 Claims. (Cl. 308—3)

(Granted under Title 35, U. S. Code (1952), sec. 266)

Our invention relates to a composition and a method for accelerating the break-in of bearing surfaces which in use will be subjected to sliding friction. In particular, it relates to a method for accelerating the break-in of bearing surfaces by the formation on said surfaces of a non-abrasive, oleophobic, silicon-containing film.

Common methods of breaking in machines which have been made to very close tolerances by elaborate machining operations includes running the machine for extended periods of time at reduced speeds and reduced loads in order to wear in the new parts. Methods of accelerating this breaking-in process have been developed but all are characterized by the fact that they employ a fine abrasive which is introduced between the sliding contacting surfaces. The disadvantages of these methods are that they are extremely time consuming, and, where an abrasive is used, inconvenient in that upon completion of the break-in the abrasive must be removed.

It is, accordingly, an object of our invention to provide a method for accelerating, without the use of an abrasive, the break-in of metal surfaces which in use will be subjected to sliding friction.

A second object of our invention is to provide a method for increasing the load-carrying capacity of bearing surfaces which in use will be subjected to sliding friction.

A third object of our invention is to provide methods for producing on bearing surfaces non-abrasive, oleophobic films which not only make possible the shortening of break-in time but simultaneously increase the load-carrying capacity of the bearing.

Another object of our invention is to provide methods for depositing non-abrasive films on the surfaces to be worn in, which comprise wetting the surfaces with an organo-silicon compound of the polysiloxane family and heating the wetted element to a controlled extent.

Another object of our invention is to provide a method of treating metal surfaces so that they may be successfully lubricated with silicone fluids.

A further object of our invention is to provide a method for treating bearing surfaces to make them capable of withstanding shock-loading at high loads.

Other objects and advantages of our invention will in part be obvious and in part appear hereinafter.

Briefly, our invention resides in the method of modifying bearing surfaces to accelerate break-in time and improve load-carrying capacity, and includes the several steps each to the other for the formation of strongly adherent, non-abrasive organo-silicon films on metal surfaces. A film deposited on a surface in accordance with our invention is produced by wetting the surface with fluid organo-silicon polymers and subjecting the wetted surface to moderately elevated temperatures or to ultra-violet radiation for periods sufficient to induce the film formation. The exact nature of the film is somewhat obscure but it is extremely thin, of the order of 0.0001 inch in thickness.

We have found that by wetting metal surfaces with organo-silicon compounds such as the organo-silicon polymers generally designated polysiloxanes and heating the wetted metal surfaces to temperatures from about 150° C. to about 300° C. there can be formed on the metal surfaces non-abrasive organo-silicon films by virtue of which the break-in time of bearings so treated will be reduced substantially, and in some cases to zero. In the following more detailed description of our invention we shall refer more specifically to copper-lead bearing metals and of the treatment thereof with a dimethyl polysiloxane, but, it is to be understood that our invention is not limited to the specific treatment described but that, in general, any polysiloxane may be used to treat any of the common bearing metals or alloys such as silver, cadmium, aluminum, magnesium, lead-indium, lead-bronze, tin-bronze, aluminum-tin, and a variety of others. We have found that when a cast iron or steel bearing is used in conjunction with a steel journal, that silicones will not lubricate the system. Such systems operated with petroleum lubricants show no marked improvement over untreated systems. Lubrication of bearing surfaces in which steel moves over steel with silicone lubricants will be successful only if the bearing, shaft, or both have been treated prior to use to place between the surfaces a non-abrasive film according to our invention. In systems where a ferrous metal is used in combination with any of the common non-ferrous metals, this difficulty is not apparent.

The nature of the steps involved in our invention comprising the formation of the non-abrasive, oleophobic film on bearing surfaces will be more readily understood by reference to the following examples, in which the break-in and load-carrying data were obtained using a unilaterally-loaded journal bearing test machine.

EXAMPLE I

A Delco copper-led journal bearing was carefully cleaned using unleaded gasoline and dried in order to remove all foreign matter from its surfaces. Benzene, toluene or any other similar cleansing agent may alternatively be used.

The bearing was then immersed in dimethyl polysiloxane, heated to about 150° C. and held at that temperature for approximately 24 hours. Upon completion of the heating process, the bearing was removed, cooled, washed with benzene, and dried.

A film had formed on the bearing surfaces as was evident by a slight change in the color of said surfaces. That is, the formation of this film is indicated by a slight color change since the film itself appears water-white or yellowish. Generally, upon the appearance of this color change, the heating process can be discontinued.

Since the degree of color change accompanying formation of a satisfactory film is slight, this method of detecting the formation of a film on the surface being treated is vague. Another method for determining the time for proper film formation is to follow the increments in weight per unit area of the specimen being treated by simultaneous treatment of small samples of metal of the same composition as the bearing being treated. Having once determined the appropriate increase in weight per unit area of bearing produced by a film, this scheme will indicate the end point of the treatment accurately.

For example, a copper-lead journal bearing of approximately 15.5 sq. cm. in area exhibited a gain in weight after treatment of approximately 0.0064 gram, or a gain of 0.000413 gram per square centimeter. This bearing was operated successfully in quick break-in, high load-carrying runs.

The dimethyl polysiloxane used in the above is a limpid fluid having a viscosity of about 73 centistokes at 100° F. and is identified commercially as Dow Corning Fluid, Series 500.

When tested in a bearing testing machine using silicone fluid as the lubricant, the bearing of Example I within 4¾ hours was able to carry safely a load of 6,000 pounds per square inch. Similar bearings not previously treated when tested in the same machine in the same manner required about 220 hours to bring them up to the maximum load of about 6,000 pounds per square inch without causing seizure in the bearing.

The formation of the film on the bearing surfaces involves two variables, time and temperature, as indicated in the plot of Figure 1.

The figure represents a semi-quantitative guide to the determination of proper time and temperature of treatment for the production of a film on a surface. Generally the coordinates defining any point in the shaded area will give an operative combination of time and temperature though not necessarily an optimum combination. For example the deposition of the film can be accomplished in 30 minutes by carrying out the treatment at about 300° C. as compared with a 7 hour treatment required while heating at 200° C. Thus it is apparent that the time-temperature relationship for the deposition of the film is exponential in character.

Another factor which influences somewhat the time of heating to obtain proper film formation on the bearing surface is the previous history of the fluid. If a fluid has been previously used for treatment of a bearing, it will be found that subsequent bearing treatments using that same fluid will require slightly less time for the formation of a film than when a fresh fluid is used. In the figure, the effect of the history of the fluid on the treatment is indicated generally by a shifting of the curve toward the temperature axis with age of the fluid.

The rate of film formation is influenced to some degree by the nature and composition of the particular bearing metal being treated. For example, we have found that the presence of lead or tin in the bearing metal accelerates the film formation on that metal whereas Babbitt metal, steel, and cuprous alloys in general inhibit or retard the film formation slightly. That is to say, treatment of any of the latter metals requires a longer time to bring about the formation of the film. Since the main constituent of the Babbitt metal used was tin and tin by itself acts to accelerate film formation, it is apparent that the presence of a small proportion of certain metals in an alloy governs the behavior of the alloy with respect to its ease of film formation.

EXAMPLE II

Bearings of the type used in Example I were wetted by dipping in dimethyl polysiloxane at ordinary ambient temperature. The bearings were allowed to drain until all excess fluid had drained off and were then placed in an oven where they were baked for about 5 minutes at a temperature of about 300° C. Here the heating operation is quite variable and comparable results can be obtained by heating at lower temperatures for longer periods of time. For example, baking for about 6 hours at 200° C. appears to be the equivalent of baking for about 5 minutes at 300° C.

Film formation by this baking process is substantially the same as that brought about by the process described in Example I, but the baking process has the advantage that the formation is brought about more quickly.

EXAMPLE III

High temperatures and the general inconvenience accompanying immersion of objects in the fluid can be avoided by wetting the bearing parts and following the wetting with an irradiation with ultra violet light for a period of 24 hours in preference to the heating step described above. An ordinary mercury vapor quartz lamp will serve as the source of ultra violet radiation. Apparently the irradiation brings about the formation of a surface film which in behavior is substantially the same as that brought about in the processes described in Examples I and II.

EXAMPLE IV

The size of objects to be treated is limited only by the size of the available silicone fluid container or treatment apparatus. For the treatment of large objects we have developed another means of wetting in which the fluid used is a solution in xylol of a water-white silicone resin having the consistency of a medium oil and solid contents of 55%. We have obtained satisfactory results with solutions ranging in concentration from 10:1 to 25:1 parts of xylol to resin which solutions are easy to apply by dipping, spraying or painting.

In general untreated bearings broken in by usage only with silicone lubricants require running for approximately 16 hours at no load and running for approximately 200 hours before a full 6000 pounds per square inch load can finally be applied. A unit load from 1800 to 3000 pounds per square inch is considered to be a good load-carrying capacity for the type of untreated bearings tested with petroleum oil lubricants. The examples shown below are for comparatively quick break-in runs, and the copper-lead bearings hereinafter referred to are standard Delco bearings. By a quick break-in run is meant operation of the bearing at 500 pounds per square inch for 2 hours and subsequently increasing the unit load in increments of 500 pounds per square inch every 15 minutes thereafter until the maximum unit load is applied.

EXAMPLE V

An untreated cooper-lead bearing of 0.001 inch±0.0001 inch clearance was tested using as the lubricant Navy Symbol 1080 petroleum oil, a light aviation engine oil containing no additives. At the end of 9 hours the maximum safe loading, 2,340 lbs. per sq. inch, was reached. Seizure occurred when the loading was increased beyond this point.

EXAMPLE VI

With reference to Example V, an identical bearing treated to deposit on its surfaces a silicone film as described was tested using 1080 oil as lubricant. A load of more than 2500 pounds per square inch was safely carried after only 5 hours of operation. At the end of 7 hours of operation the treated bearing safely supported more than 4,000 pounds per square inch.

EXAMPLE VII

An untreated bearing of 0.001 inch ± 0.0001 inch clearance was tested using Dow Corning Fluid, Series 500, hereinafter referred to as DC-500, as the lubricant, and seizure occurred at 500 pounds per square inch after only 1.25 hours of run. DC-500 silicone lubricant has approximately the same viscosity as 1080 petroleum oil at 148° F., which temperature is close to a mean of the bearing temperatures encountered.

This run is a typical illustration of the difficulty encountered in the use of silicones as lubricants. As illustrated by Example VIII below, we have found that a silicone film is necessary for the operation at high unit loads of silicone fluid lubricated journal bearings.

EXAMPLE VIII

Using an identical bearing treated to form on its surfaces a silicone film, and lubricating with DC-500, a load of 6,022 pounds per square inch was applied in only 5 hours. After operating the bearing successfully under these conditions, the load was reduced to 500 lbs. per sq. inch. In approximately one-half hour the bearing was shock loaded to the full load of more than 6,000 lbs. per sq. inch and operated successfully to the completion of the run.

The load of 6000 lbs. per sq. in. is not to be construed here as being the maximum load that a treated silicone-lubricated bearing can sustain. This figure merely represents the load limit of our test machine. Many runs were made on treated silicone-lubricated bearings in which the load limit of our machine was safely carried. Therefore, it is safe to say that the highest load-carrying capacity of silicone lubricated bearings treated according to the process of our invention is more than 6000 pounds per square inch.

Assuming 2400 pounds per square inch as a good load-carrying capacity for a bearing lubricated with petroleum oil and normally broken in in about 9 hours, it can be calculated from our examples that we may shorten the break-in time by 44% and increase the load-carrying capacity by approximately 67% by treating bearings for use with petroleum oil. When silicone is used as a lubricant with treated bearings the corresponding figures are a decrease in break-in time of 97.5% and an increase in load-carrying capacity of more than 1100%.

Since these figures are based on the 6000 pound limit of our machine, the percentage increase shown in the latter case for silicone-lubricated treated bearings may probably be much higher.

After the treatment a surface may be lubricated in the usual manner with petroleum oil or with a silicone fluid. The decrease in break-in time is usually about the same in both cases but generally when the later lubricant is used a much greater increase in load-carrying capacity is achieved. We attribute this fact to the use of a lubricant capable of chemically reproducing the surface film and healing any damage to it during operation.

To better illustrate the use of silicone fluids as high temperature lubricants for bearings treated in accordance with our invention, we refer to the table below. Data for these typical hot runs were obtained using the same type of copper-lead bearings and DC-500 as the lubricant. The same type of test machine was used but had provision for applying heat externally to the test bearing and its holder.

*Table*

| Time of run in hrs. (To nearest 0.1 hr.) | Average load in p. s. i. (To nearest 100#) | Average Bearing (To nearest ° F.) |
|---|---|---|
| 29 | 6,000 | 450 |
| 28 | 6,000 | 470 |
| 38 | 6,000 | 475 |
| 32 | 6,000 | 500 |
| 94 | 6,000 | 455 |

All of these representative runs were highly successful and no evidences of incipient seizure were present.

Our invention, accordingly, provides simultaneously a method for attaining a quick breaking-in and improved load-carrying capacity. When a silicone fluid is used as the lubricant the load-carrying capacity becomes much greater than when a petroleum oil is used. It enables the surface treated to be operated at much higher temperatures than are usually encountered and to withstand shock-loading at high loads. The film upon which the above attributes depend is of a a non-abrasive nature, is oleophobic and is very strongly adherent to metal surfaces. Objects may be treated prior to assembly for use with no measurable change in tolerances.

Though we have described specific examples in the above by reference to the use of dimethyl polysiloxane, for deposition of the films, it is to be understood that any silicone fluid such as the diphenyl, dimethyl, or methyl phenyl polysiloxane may be used.

The invention described herein may be manufactured and used by or for the Government of the United States of America for governmental purposes without the payment of any royalties thereon or therefor.

What is claimed is:

1. A bearing structure provided with a recess having a new metal surface which when broken-in is adapted to serve as a bearing surface for a closely fitting movable metal-surfaced part of the reverse contour, the new metal surface of the recess being in the non-broken-in condition and having thereon an extremely thin strongly adherent film of a thermoplastic polysiloxane formed through polymerization in situ of a liquid polysiloxane.

2. A bearing structure provided with a concavity having a new metal surface which when broken-in is adapted to serve as a bearing surface for a closely fitting rotatable metal-surfaced part of the reverse contour, the new metal surface of said concavity being in the non-broken-in condition and having thereon an extremely thin strongly adherent film of a thermoplastic polysiloxane formed through polymerization in situ of a liquid polysiloxane.

3. A bearing structure as defined claim 1, wherein the new metal surface of the recess is of ferrous metal.

4. A bearing structure as defined in claim 2, wherein the new metal surface of the concavity is of ferrous metal.

5. In a mechanical assembly, parts arranged for sliding frictional contact with each other and having opposed metal surfaces of which at least one is new and not broken-in and has thereon an extremely thin strongly adherent film of a thermoplastic polysiloxane formed through polymerization in situ of a liquid polysiloxane.

6. In a mechanical assembly as defined in claim 5, wherein the opposed surfaces of the parts are of ferrous metal.

7. In a mechanical assembly, parts arranged for sliding frictional contact with each other and having opposed metal surfaces of which one is concave and the other convex and one at least is new and not broken-in and has thereon an extremely thin strongly adherent film of a thermoplastic polysiloxane formed through polymerization in situ of a liquid polysiloxane.

JERE E. BROPHY.
JOHN LARSON.

References Cited in the file of this patent

UNITED STATES PATENTS

| Number | Name | Date |
| --- | --- | --- |
| 2,258,218 | Rochow | Oct. 7, 1941 |
| 2,258,219 | Rochow | Oct. 7, 1941 |
| 2,258,220 | Rochow | Oct. 7, 1941 |
| 2,371,068 | Rochow | Mar. 6, 1945 |
| 2,375,998 | McGregor et al. | May 15, 1945 |
| 2,380,995 | Rochow | Aug. 7, 1945 |
| 2,380,996 | Rochow | Aug. 7, 1945 |
| 2,386,466 | Hyde | Oct. 9, 1945 |
| 2,441,320 | Hyde | May 11, 1948 |
| 2,449,572 | Welch | Sept. 21, 1948 |

OTHER REFERENCES

Ultra Violet Rays and their effect on Paint—"The Painters' Magazine," August 1934, pages 22–23.

Circular 705 Scientific sec. Nat'l Paint, Varnish & Lacquer Assoc., Inc., May 1945.